United States Patent Office 3,442,893
Patented May 6, 1969

3,442,893
STEROID ANALOGS
Don Murl Lynch, Waukegan, Ill., assignor to Abbott Laboratories, Chicago, Ill., a corporation of Illinois
No Drawing. Filed May 23, 1966, Ser. No. 551,895
Int. Cl. C07d 31/34, 31/28, 29/16
U.S. Cl. 260—240  9 Claims

ABSTRACT OF THE DISCLOSURE 5,6-disubstituted and 5-monosubstituted 4′-pyridylalkyl-1-indanes are described; they are useful growth regulators for the reproductive glands of warm-blooded animals.

---

The present invention is directed to indanes substituted in the 1- and 5- or in the 1-, 5- and 6-positions. More particularly, this invention relates to 4-pyridylalkyl-1-indanes substituted in the 5- or in the 5- and 6-positions, and analogs as well as acid addition products thereof.

The compounds of the present invention have the general formula

I

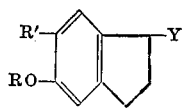

wherein R is hydrogen, acyl or methyl, R′ is hydrogen or RO, Y is a radical of the formula =CH—Z, —CH$_2$—Z or —CH(CH$_3$)—Z, wherein Z is 4-pyridyl, 4-piperidyl or 4-N-acylpiperidyl, with each acyl meaning H(CH$_2$)$_m$CO wherein $m$ is an integer from 1 to 4. These indane derivatives and their acid addition salts have biological activity, causing decreased metabolic activities in the reproductive organs of warm-blooded animals.

The new compounds are prepared by condensing a 5-methoxy or a 5,6-dimethoxy-1-indanone with a pyridine derivative of the formula

II

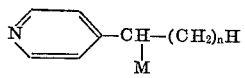

wherein $n$ is 0 or 1 and wherein M is an alkali metal, in the presence of an anhydrous, inert, organic solvent at a temperature between 0° and 100° C. under anhydrous conditions for a period of at least 15 minutes. The resulting condensation product is mixed with water and separated from the inorganic material. The solvent is then removed by distillation to leave the condensation product carrying a double bond between the indanyl group and the alkyl group attached to the pyridine ring; in some instances, however, the double bond shifts into the indane ring. These compounds may be hydrogenated selectively at the mentioned double bond adjacent to the 1-position of the indane ring, or hydrogen can be added at that double bond and in the pyridine ring simultaneously. In the latter case, the nitrogen of the piperidine ring so formed can be acylated by known procedures. The obtained products can then be modified at the 5- (and 6-) position of the indane ring by cleavage of the alkoxy group to give the corresponding 5- (or 5,6-di-)hydroxy-1-(4-piperidylalkyl)-indanes. Alternatively, the alkoxy group may be cleaved prior to the hydrogenation to give the corresponding 5- (or 5,6-di-)hydroxy-1-(4-pyridylalkyl) indanes which may subsequently be hydrogenated to the above piperidylalkyl derivative. In both, the pyridyl and the piperidyl derivative, the 5- (and 6-)hydroxy group of the indane ring may be acylated with a lower fatty acid by known methods; also, the hydrogen atom at the nitrogen of the piperidine derivative may be acylated by known procedures to give the corresponding N-acylpiperidylalkyl derivatives of 5- (or 5,6-)substituted 1-indane.

The above pyridyl compounds of Formula II can be prepared in situ from sodium, liquid ammonia and γ-picoline or 4-ethylpyridine. Alternately, commercial sodamide may be used. In the latter case, commercial sodamide is first reacted with the selected 4-pyridine derivative under ice cooling and the metal-organic condensation product formed is then reacted with a 1-indanone carrying the selected substituents at the 5- and 6-positions, initially under ice cooling and subsequently at room temperature.

The above reference to an anhydrous, inert, organic solvent indicates that the reaction medium is to be water-free and selected in such a way that it does not react with either starting material or the end product. For example, the solvent may be toluene, benzene, or a pyridine derivative of Formula II, wherein M is hydrogen.

To illustrate the preparation of the new compounds, reference is made to the following examples which are not meant to limit the invention in any respect. In these examples a mixture of solvents given without ratio means that the first-named solvent is used initially to dissolve the named compound; the second solvent is added to a concentrate of the first solution to induce or to complete crystallization of the compound. Where a ratio is named after the solvent mixture, it means that a mixture of such solvents is used initially in the named ratio.

Example 1.—5-methoxy-1-(4-pyridylmethylene)indane

Sodium (24 g.) is added in portions to a stirred solution of 600 ml. of liquid ammonia containing a crystal of ferric nitrate hydrate. After the last piece of sodium has been added, the mixture is stirred for one hour and the flask is then immersed into a Dry Ice/acetone bath. Under stirring, 102 ml. of γ-picoline is added dropwise over a period of ten minutes. The Dry Ice bath is then removed and the mixture is stirred for another 15 minutes. The Dry Ice condenser is replaced by an air condenser, and 200 ml. of dry ether is added dropwise while the ammonia is evaporated. The last traces of ammonia are driven off by immersing the flask into a hot water bath. The formed dark oil is cooled in an ice bath and 55 g. of 5-methoxy-1-indanone in 300 ml. of γ-picoline is added very rapidly. The mixture is stirred at room temperature overnight and then poured onto ice. The formed condensation product is extracted with ether from which solution the excess γ-picoline is removed by low pressure distillation. The residue is taken up in 10% aqueous hydrochloric acid and filtered with suction to give 53.9 g. of an orange solid which is taken up in benzene and filtered with suction to dissolve and remove excess indanone. The insoluble precipitate weighs 43.7 g., producing 43 g. of pure 5-methoxy-1(4-pyridylmethylene)indane hydrochloride as dark yellow crystals melting, after crystallization in water, at 235–240° C. (decomposition).

The hydrochloride is taken up in water and the mixture is made alkaline by adding 10% aqueous sodium hydroxide. The organic material is worked up through chloroform extraction resulting in pure 5-methoxy-1-(4-pyridylmethylene)indane. After recrystallization from benzene/hexane, the pure compound is obtained in the form of dark yellow crystals melting at 141.5–144.5° C.

Example 2.—5,6-dimethoxy-1-(4-pyridylmethylene) indane

In a repetition of Example 1 but using 5,6-dimethoxy-1-indanone as the co-reactant for γ-picoline, pure 5,6-dimethoxy-1-(4-pyridylmethylene)indane is obtained in a yield of 36% of theory as light yellow crystals, melting at 147.5–149.5° C. after recrystallization from benzene. The corresponding hydrochloride salt melts at 224–226° C. and is obtained as yellow-orange crystals.

Example 3.—5-methoxy-1-(4-pyridylmethyl)indane

A 15 g. sample of the compound of Example 1 is hydrogenated at 50–60° C. at a pressure of 2–3 atm. in ethanol solution and in the presence of 2.5 g. of a 5% palladium-on-carbon catalyst. A 92% yield of 5-methoxy-1-(4-pyridylmethyl)indane is obtained as a white solid, melting at 68–71° C. after crystallization from benzene/hexane. The corresponding hydrochloride melts at 195–197° C.

Example 4.—5-methoxyl-1-(4-pyridyl-1-ethyl)indane

By following the procedure of Examples 1 and 3 but using 4-ethylpryridine as the co-reactant for the 5-methoxy-1-indanone, 5-methoxy-1-(4-pyridyl-1-ethyl)indane is obtained in a yield similar to that obtained when γ-picoride melts at 190–293° C.

Example 5.—5,6-dimethoxy-1-(4-pyridylmethyl)indane

By hydrogenating the compound of Example 2 by the process described in Example 3, one obtains 5,6-dimethoxy-1-(4-pyridylmethyl)indane in a yield of 92% as white crystals, melting at 80–82.5° C. after crystallization from benzene/hexane. The corresponding hydrochloride melts at 190–193°. C.

Example 6.—5,6-dimethoxy-1-(4-pyridyl-1-ethyl)indane

By following the procedure of Example 4 but using as the starting material the condensation product obtained from 5,6-dimethoxy-1-indanone and 4-ethyl pyridine according to Example 1 one obtains 5,6-dimethoxy-1-(4-pyridyl-1-ethyl)indane in good yield.

Example 7.—5,6-dimethoxy-1-(4-piperidylalkyl)indanes (a) A sample of 8.46 g. of the compound described in Example 5 in ethanol is hydrogeneated at a pressure of about 3 atm. at 60° in the presence of 3.1 g. of hydrochloric acid and 2.5 g. of a 5% rhodium-on-carbon catalyst. 5,6-dimethoxy-1-(4-piperidylmethyl)indane is obtained in a yield of 77% of theory in the form of white crystals, melting at 79.5–81.5° C. after crystallization from benzene/hexane. The corresponding hydrochloride melts at 250–253° C. with decomposition.

(b) Hydrogenation of 5,6-dimethoxy-1-(4-pyridyl-1-ethyl)indane in the above manner produces 5,6-dimethoxy-1-(4-piperidyl-1-ethyl)indane in good yield.

Example 8.—5,6-dimethoxy-1-(4-N-acylpiperidylalkyl)-indanes (a) To a sample of 1.4 g. of the compound of Example 7a in 50 ml. of dry ether is added 0.71 ml. of triethylamine and 0.36 ml. of acetyl chloride in 10 ml. of ether. The mixture is stirred for 45 minutes at room temperature. After adding 100 ml. of ice-water, the product is extracted with ether. Work up of the ether solution produces a 81% yield of 5,6-dimethoxy-1-(4-N-acetylpiperidylmethyl)indane, melting at 90–92.5° after recrystallization from benzene/hexane and showing $\gamma_{max.}$ of 1623 cm.$^{-1}$.

(b) By replacing the above acetyl chloride with butyryl chloride, 5,6-dimethoxy-1-(4-N-butyrylpiperidylmethyl)-indane is obtained. Similarly, 5,6-dimethoxy-1-(4-N-acetypiperidyl-1-ethyl)indane is obtained when the product of Example 7b is treated in the above manner.

Example 9.—1-(4-pyridylmethyl)-5-indanol (a) A mixture of 2 g. of the compound of Example 3 and 6.5 g. of pyridine hydrochloride is heated to 200–210° C. while stirring under a nitrogen atmosphere for 40 minutes. The mixture is then cooled in an ice bath and diluted with 25 ml. of water, before adding 5% aqueous sodium hydroxide to make it alkaline. The alkaline mixture is extracted with ether. The acqueous phase is acidified with Dry Ice and extracted with chloroform. From the chloroform extract, 1-(4-pyridylmethyl)-5-indanol is obtained in a yield of 58% in the form of fine white crystals, melting at 223–226° C. after crystallization from benzene/ethanol.

(b) When the product of Exemaple 4 is used in the above demethylation procedure, 1-(4-pyridyl-1-ethyl)-5-indanol is obtained.

Example 10.—1-(4-pyridylmethylene)-5-indanol

Demethylation of the compound described in Example 1 in the manner described in Example 9 produces an insoluble dark red solid. This solid is dissolved in methamol/ether and treated with aqueous sodium hydrosulfite. Extraction of this mixture with chloroform produces a yellow solid which, after crystallization from methanol/hexane, produces 1-(4-pyridylmethylene)-5-indanol as yellow crystals, melting at about 205° C. under decomposition.

Example 11.—5,6-dihydroxy-1-(4-pyridylalkyl)indanes

By following the procedure of Example 9 but using 5,6-dimethoxy-1-(4-pyridyl-1-ethyl)indane as the starting material, 5,6-dihydroxy-1-(4-pyridyl-1-ethyl)indane is obtained in moderate yield.

Similarly, when the process of Example 9 is applied to 5,6 - dimethoxy-1-(4 - pyridylmethyl)indane, one obtains 5,6-dhydroxy-1-(4-pyridylmethyl)indane.

Example 12.—5,6-dihydroxy-1-(4-piperidylalkyl)indane

By following the procedure of Example 9 but using 5,6-dimethoxy-1-(4-piperidyl-1-ethyl)indane as the starting material, 5,6-dihydroxy-1-(4-piperidyl-1-ethyl)indane is obtained in moderate yield. Similarly, when this process is applied to the compound of Example 7a, 5,6-dihydroxy-1-(4-piperidylmethyl)indane is obtained.

As will be readily understood by those skilled in the art, the compounds carrying a hydroxy group in the 5-position of the indane moiety can easily be acylated by standard methods, e.g. by esterifying them with at least an equimolar amount of a lower fatty acid anhydride or acid chloride in the presence of an acid binder, e.g. pyridine or an alkali metal carbonate.

The compounds of the present invention easily form acid addition salts with strong acids such as mineral acids. Among the mineral acids, those which are pharmaceutically acceptable are preferred; e.g. the hydrochloride, sulfate and phosphate salts.

The new compounds, as free bases or as their acid-addition salts, may be administered orally, intramuscularly or subsucutaneously to warm-blooded animals as suspensions or solutions in water or vegetable oils containing between 1% and 10% of the active material. Such administration particularly delays the reproductive cycle in females when applied in dosages between 0.5 to 2.0 mg./kg./day.

Others may practice the invention in any of the numerous ways which will be suggested to one skilled in the art by the present disclosure. All such practice of the invention is considered to be a part hereof provided it falls within the scope of the appended claims.

I claim:
1. A compound of the formula

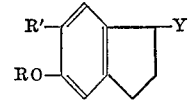

wherein R is hydrogen, acyl or methyl, R' is hydrogen or RO, Y is a radical of the formula =CH—Z, —CH$_2$—Z or —CH(CH$_3$)—Z, wherein Z is 4-pyridyl, 4-piperidyl or 4 - N - acylpiperidyl with each acyl representing H(CH$_2$)$_m$CO wherein $m$ is an integer from 1 to 4, and an acid addition salt thereof.

2. The compound of claim 1 wherein R is methyl, R' is hydrogen and Y is

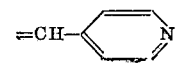

3. The compound of claim 1 wherein R is methyl, R' is methoxy and Y is

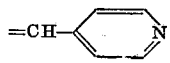

4. The compound of claim 1 wherein R and R' are hydrogen and Y is

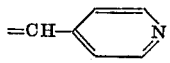

5. The compound of claim 1 wherein R is methyl, R' is methoxy and Y is

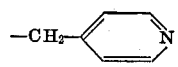

6. The compound of claim 1 wherein R is methyl, R' is hydrogen and Y is

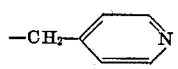

7. The compound of claim 1 wherein R and R' are hydrogen and Y is

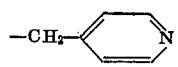

8. The compound of claim 1 wherein R is methyl, R' is methoxy and Y is

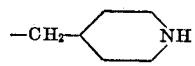

9. The compound of claim 1 wherein R is methyl, R' is methoxy and Y is

References Cited
UNITED STATES PATENTS 3,337,542  8/1967  Pappo _____ 260—240

HENRY R. JILES, *Primary Examiner.*

HARRY I. MOATZ, *Assistant Examiner.*

U.S. Cl. X.R.

260—294, 294.3, 294.7, 295, 297, 999

UNITED STATES PATENT OFFICE
CERTIFICATE OF CORRECTION

Patent No. 3,442,893                                                                                  May 6, 1969

Don Murl Lynch

It is certified that error appears in the above identified patent and that said Letters Patent are hereby corrected as shown below:

Column 3, lines 14 and 15, "$\gamma$-picoride melts at 190-293° C." should read -- $\gamma$-picoline is used as reactant. --. Column 4, line 10, "mol" should read -- nol --; line 23, "dhydroxy" should read -- dihydroxy --.

Signed and sealed this 14th day of April 1970.

(SEAL)
Attest:

Edward M. Fletcher, Jr.                                WILLIAM E. SCHUYLER, JR.
Attesting Officer                                                Commissioner of Patents